T. POWELL,
Assignor, by mesne assignments, to G. FROST.
Garment-Supporters.
No. 8,864. Reissued Aug. 19, 1879.
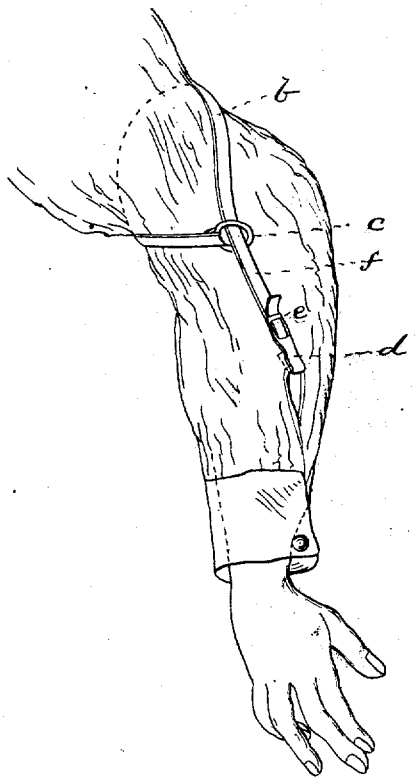
Witnesses.
L. P. Connor.
N. E. Whitney.
Inventor.
Thomas Powell
by Crosby & Gregory
Attys
N. PETERS, PHOTO-LITHOGRAPHER, WASHINGTON, D. C.

UNITED STATES PATENT OFFICE.

THOMAS POWELL, OF MILROY, INDIANA, ASSIGNOR, BY MESNE ASSIGNMENTS, TO GEORGE FROST, OF BOSTON, MASSACHUSETTS.

IMPROVEMENT IN GARMENT-SUPPORTERS.

Specification forming part of Letters Patent No. 63,092, dated March 19, 1867; Reissue No. 8,864, dated August 19, 1879; application filed March 28, 1879.

*To all whom it may concern:*

Be it known that I, THOMAS POWELL, formerly of Milroy, in the county of Rush and State of Indiana, have invented a new and Improved Supporter for Parts of Garments, which is exemplified as a sleeve-supporter, and of which the following, in connection with the accompanying drawing, is a specification, which will enable others to understand and practice my invention.

My improved supporter is illustrated as applied to a shirt-sleeve, for which it is herein specially designed, although it can be used to advantage upon the sleeves or tubular parts of other articles of wearing-apparel, the object being to produce a supporter for such use which will be comfortable and easy to the wearer.

In the accompanying drawing my improved supporter is illustrated as applied or worn upon the arm.

The supporter consists of a band, *b*, of india-rubber or any other suitable elastic material or materials, having at one end an engaging device, *d*, shown as a hook, to be engaged with the garment to be supported, the opposite end of the band being provided with a band-connecting device, (shown as a ring or loop, *c*,) its function being to connect an end of the band with the body of the band between its ends, thereby leaving a looped or encircling portion in the band and a dependent end, *f*, to which the engaging device is secured below the junction of the connecting device with the band between its ends.

The device *d* may be secured to the band by means of a buckle, *e*, which will allow it to be adjusted in position upon the band.

When the supporter is worn, as herein shown, for a sleeve, it is so looped around the arm above the elbow that the part *c* connects with the band between its two ends, and the engaging device *d* at the lower end of the band, and depending from the encircling portion, is engaged with and holds up the sleeve, and so applied it does not produce or occasion an uneasy or uncomfortable feeling in the arm of the wearer.

In lieu of hook *d*, a button may be used. An elastic band encircling a portion of the body, and having its ends directly connected like a garter, does not rest diagonally against the person and bear or press more at one portion of the encircling part than at another, as is the case with my supporter, wherein it will be noticed that the encircling portion has a diagonal bearing upon the flesh or muscle, and bears with least force at or near the connection of *c* with the body of the band between its ends. This feature is one peculiar to this my supporter, and therein it differs from and possesses advantages not common to bands which simply surround or encircle like an ordinary garter.

A supporter embodying this my invention impedes the circulation of the blood to a less degree than would a rubber or elastic annular band, and is therefore more comfortable and healthful.

The length of the depending portion will depend upon the quantity of material required for the looped portion of the band; but it will be obvious that this supporter may be readily applied to persons of different sizes, the only caution to observe being that it be large enough for persons of the largest size, and for smaller persons the length of the depending portion will, when the supporter is applied, be longer than with the larger persons.

Should a sleeve be supported by an ordinary band or annulus in one piece, or by a band connected at both ends by means of a hook and eye, as practiced in the case of garters, such bands for different persons have to be made of many different lengths.

I claim as new and desire to secure by Letters Patent—

As an improved article of manufacture, a garment-supporter composed of an elastic fibrous band, *b*, having one of its ends passed about the person and connected with itself, in combination with a depending end carrying a garment-engaging device, substantially as specified.

THOMAS POWELL.

Witnesses:

S. CRUMRINE,

W. H. CRUMRINE.